(12) United States Patent
Buschmann et al.

(10) Patent No.: US 8,744,646 B2
(45) Date of Patent: Jun. 3, 2014

(54) SYSTEM FOR CONTROLLING CONSTRUCTION SITE VEHICLES

(75) Inventors: Martin Buschmann, Neustadt (DE); Ralf Weiser, Ladenburg (DE); Achim Eul, Mannheim (DE); Arnold Rutz, Ludwigshafen (DE)

(73) Assignee: Joseph Vogele AG, Ludwigshafen/Rhein (DE)

( * ) Notice: Subject to any disclaimer, the term of this patent is extended or adjusted under 35 U.S.C. 154(b) by 85 days.

(21) Appl. No.: 13/444,287

(22) Filed: Apr. 11, 2012

(65) Prior Publication Data
US 2012/0265371 A1    Oct. 18, 2012

(30) Foreign Application Priority Data

Apr. 18, 2011    (EP) ................... 11003246

(51) Int. Cl.
*G05D 1/00* (2006.01)

(52) U.S. Cl.
USPC ............................ 701/2; 701/50

(58) Field of Classification Search
USPC ............ 701/2, 50; 340/908, 908.1, 933
See application file for complete search history.

(56) References Cited

U.S. PATENT DOCUMENTS

| | | | |
|---|---|---|---|
| 5,100,277 A | 3/1992 | Musil | |
| 5,471,391 A | 11/1995 | Gudat et al. | |
| 5,493,494 A | 2/1996 | Henderson | |
| 5,935,192 A | 8/1999 | Henderson et al. | |
| 6,244,782 B1 | 6/2001 | Bitelli | |
| 6,805,516 B2 | 10/2004 | Barnat et al. | |
| 6,862,521 B1 | 3/2005 | Fox | |
| 7,484,911 B2 | 2/2009 | Frelich | |
| 7,572,081 B2 | 8/2009 | Buschmann | |
| 7,731,450 B2 | 6/2010 | Congdon et al. | |
| 7,984,184 B2 | 7/2011 | Woon et al. | |
| 2002/0059320 A1 | 5/2002 | Tamaru | |
| 2002/0182009 A1 | 12/2002 | Barnat et al. | |
| 2004/0260504 A1 | 12/2004 | Bienvenu et al. | |
| 2006/0047377 A1 | 3/2006 | Ferguson et al. | |
| 2007/0050137 A1 | 3/2007 | Woon et al. | |
| 2008/0006373 A1 | 1/2008 | Lin | |

(Continued)

FOREIGN PATENT DOCUMENTS

| | | |
|---|---|---|
| DE | 19744772 A1 | 6/1998 |
| DE | 69416006 D1 | 2/1999 |

(Continued)

OTHER PUBLICATIONS

Non-Final Office Action dated Sep. 25, 2013 issued in U.S. Appl. No. 13/444,200.

(Continued)

*Primary Examiner* — Thomas Black
*Assistant Examiner* — Luke Huynh
(74) *Attorney, Agent, or Firm* — Fish & Richardson P.C.

(57) ABSTRACT

A system for controlling construction site vehicles has a plurality of construction site vehicles and a control room. Data can be transmitted on communication channels between the control room and the construction site vehicles. In the control room, at least one digital map is stored in which at least one additional piece of information is stored for individual road sections, in addition to the route of the respective road section. A navigation module is provided and designed to generate, with reference to the at least one digital map, navigation recommendations for the construction site vehicles.

17 Claims, 2 Drawing Sheets

(56) References Cited

U.S. PATENT DOCUMENTS

| | | |
|---|---|---|
| 2010/0140618 A1 | 6/2010 | Reinmuth et al. |
| 2010/0178107 A1 | 7/2010 | Braddy et al. |
| 2012/0051839 A1 | 3/2012 | Begley et al. |
| 2012/0271489 A1* | 10/2012 | Roberts et al. .................... 701/2 |
| 2012/0288328 A1 | 11/2012 | Minich |

FOREIGN PATENT DOCUMENTS

| | | |
|---|---|---|
| DE | 10151942 A1 | 12/2002 |
| DE | 102006021015 A1 | 11/2007 |
| DE | 602004011968 D1 | 4/2008 |
| DE | 102008054481 A1 | 6/2010 |
| EP | 1897997 A2 | 3/2008 |
| JP | 2000028699 A | 1/2000 |
| JP | 2003050803 A | 2/2003 |
| JP | 2004318443 A | 11/2004 |
| JP | 2005242460 A | 9/2005 |
| JP | 201072696 A | 4/2010 |
| WO | WO0070150 A1 | 11/2000 |

OTHER PUBLICATIONS

Office Action dated Oct. 1, 2013 issued in JP Patent Application Serial No. 2012-090368.

* cited by examiner

SYSTEM FOR CONTROLLING CONSTRUCTION SITE VEHICLES

BACKGROUND OF THE INVENTION

The invention relates to a system for controlling construction site vehicles. These construction site vehicles can be trucks, low-bed trucks, road finishing machines, feeders, rollers, concrete mixers, excavators, service vehicles, vehicles of a security service and/or passenger carriers, and any further vehicles that can be present on a site.

In the past, many suggestions have been already made showing how construction sites could be better monitored, controlled or documented for applying road toppings with more uniform work results. For example, DE 101 51 942 B4 discloses a working machine management system wherein construction vehicles can communicate with each other and with a job-site office. The exchanged data can relate, for example, to information on thefts, construction project costs, component requirement predictions, service requirement predictions, weather data or fuel consumption. DE 60 2004 011 968 T2 describes a further system for exchanging information on sites. In this system data exchange between mobile construction vehicles and a job-site office is accomplished by means of an internet protocol. DE 10 2008 054 481 A1 describes an asphalt system wherein the navigation of construction vehicles is based on a so-called position temperature model. The system determines where to best employ compacting vehicles on the basis of the initially assessed and then measured asphalt temperature.

According to US 2004/0260504 A1, asphalt-related measured data can be transmitted in a wireless communication system. DE 101 51 942 B4 describes that a certain identification is allocated to each construction vehicle. Another fleet management system for construction vehicles can be taken from U.S. Pat. No. 6,862,521 B1. WO 00/70150 A1 describes the measurement of the asphalt temperature at a road finishing machine. The measured temperature data are forwarded to a compactor following the road finishing machine.

DE 197 44 772 A1 describes the determination of a local compacting level to inform a compactor how many times he must drive over the stated area. DE 694 16 006 T2 describes a further variant for controlling a compactor, for example a roller. The navigation of a compacting roller depending on the degree of compaction in road construction is also treated in EP 1 897 997 A2. Another method of establishing an individual traffic outlook for a vehicle, which, however, is not related to construction sites, is known from DE 10 2006 021 015 A1.

BRIEF SUMMARY OF THE INVENTION

It is the object of the present invention to improve a system for controlling construction site vehicles such that a preferably smooth operating procedure of the site is possible, and the quality of the work result of the site processes possibly becomes better.

This object is achieved by the system of the present invention.

The system according to the invention comprises a plurality of construction site vehicles of one or several ones of the types mentioned supra. The system furthermore comprises a control room. Data can be transmitted from the control room to the construction site vehicles and/or vice versa on communication channels. At least one digital map is furthermore stored in the control room. On at least one of the stored digital maps, a construction site is recorded which is controlled by the construction site vehicles or on which the construction site vehicles are to operate. In this digital map, in addition to the route of the respective road section, at least one additional piece of information is stored for individual road sections. Moreover, a navigation module is provided and adapted to generate, on the basis of the at least one digital map, navigation recommendations for the construction site vehicles. The advantage of the invention is that with reference to the additional information, the navigation recommendations for the construction site vehicles cannot only be optimized in view of a preferably short route, but also in view of further or other site-relevant parameters.

The navigation module is preferably implemented in the form of a computer program. This permits a particularly quick and secure detection and evaluation of all relevant data and conversion of the data into navigation recommendations. In the computer program, (optionally variable) rules can be stored and determine in which way, and with which emphasis, different information influences the navigation recommendations.

The navigation module could be implemented in the control room. The navigation recommendations would be generated there and then transmitted to the individual construction vehicles via the communication channels. As an alternative, it would also be conceivable to implement a navigation module in a construction site vehicle. The construction site vehicle could retrieve the digital map or the information stored in it over the communication channels, respectively, from the control room to subsequently convert this information into navigation recommendations in the vehicle's own navigation module.

It is suitable for the route and/or the stored additional information of a road section to be variable in the digital map. This is particularly advantageous with respect to the site processes underlying the invention where road sections and their states or driving conditions can change. This is in particular true if a site and corresponding road sections in road construction, in railway construction, in airport construction or in other huge construction projects are concerned.

In principle, any site-relevant additional information can be stored in the digital map for the individual road sections. For example, the at least one additional piece of information can be coordinates of temporary roadways or temporary site approach roads whose location is changing during the operating procedure on the construction site. These can equally be coordinates and the direction of temporary one-way road sections. It is in particular advantageous for at least one additional piece of information to relate to the condition of a road section and thus represent, for example, the current road topping, the pothole density, a degree of shaking for the construction vehicles driving over the road section (e.g. depending on the vehicle speed), or the presence of icy and snowy conditions. The additional information can also relate to a characteristic number for a maximal axle load, a characteristic number for a maximal vehicle or road width, a characteristic number for curve radii, a characteristic number for a height restriction, a characteristic number for a maximal speed, the operation times, traffic jam information and/or information on temporary bans on driving. All this information is principally site-relevant and can be utilized to optimize the navigation recommendations for the construction site vehicles with respect to the progress of the construction process which is as smooth, quick and trouble-free as possible.

On construction sites, construction site vehicles must sometimes use farm paths (viz. construction site paths) and provisionally built roads as well as temporarily present approach and exit roads, and optionally one-way roads to the or on the construction site area. The invention permits to include information on such roads in the navigation.

Temporary approach roads are often not ideally paved, so that they are not designed for heavy construction site vehicles above a certain axle load and can only be driven on within limits or not at all in bad weather conditions. For time and cost reasons and for avoiding too extreme interventions in the surrounding area, the width of such construction site roads is often restricted. As a result, construction site vehicles may not exceed a determined maximal width on the temporary roads to be allowed to drive on these roads or to be able to drive past each other. Such temporary roads are therefore often only permitted for one-way traffic.

For larger construction site vehicles, the curve radii on temporary farm ways are often too small. Therefore, there is a risk in that larger construction site vehicles, such as trucks or tractors, get into the unpaved side strip when they drive on these ways. The consideration of characteristic numbers about curve radii of road sections prevents the traffic jams, transposition maneuvers and delays caused by it.

One can also find on many sites the bridging of roads by supply lines, for example in the form of hose bridges. Such hose bridges or other bridge constructions can limit the height the vehicles may have on the road section in question. Here, like with roads with narrow curve radii, there also is a risk in that, when such approach roads are erroneously traversed, following traffic is hindered due to maneuvering or transposition actions. In the worst case, damages to objects or persons can occur in the process which are reduced or even completely avoided by taking into account corresponding information in the system of the present invention. Thus, the system according to the invention considerably contributes to safety on site.

The above mentioned characteristic numbers for the condition of road sections, the axle load, the road width, curve radii or the like do not have to be actual numbers; the corresponding information can also be stored in another form, for example in the form of categories (A, B, C, ...). For example, "A" can characterize a particularly good condition of a road section, a curve radius below 10 meters, a height restriction of 3.0 meters, or the like, "B" can be a somewhat worse condition of the road section, a curve radius between 10 and 14 meters, a height restriction to 3.30 meters, etc.

The system according to the invention develops particular advantages if the additional information comprises information on construction site vehicles currently present on the respective road section. This makes it possible to better distribute the site traffic, so that individual road sections are not excessively frequented. This reduces the risk of traffic jams and excessive loads on individual road sections.

The additional information from the digital map can be stored in the form of an editable file for the respectively allocated road section. This makes it possible to update the respective additional information and/or supplement it by further additional information.

Preferably, the additional information can be editable taking into consideration data that are transmitted from a construction site vehicle to the control room. If it is detected at a construction site vehicle, for example, that additional information on a certain road section is not up to date (because e.g. the width, the height restriction or a one-way road regulation have changed), the construction site vehicle can transmit corresponding correction information to the control room so that the digital map can be always kept up to date there.

It is, in particular, conceivable that information on locations and time can be transmitted from a construction site vehicle to the control room. This information on locations and time indicates at what time the respective construction site vehicle is or was located at a certain site. The detection and processing of this information on locations and time permits the calculation of the actual travel time on certain routes in the control room allowing for the actual conditions (for example weather and traffic jams). This calculation of the travel time is clearly more precise than the assessment of travel times only on the basis of the length of a certain route.

The system according to the invention can comprise vehicle detection means for detecting the different construction site vehicles. Such vehicle detection means can be realized, for example, in the form of GNSS receivers (GNSS: Global Navigation Satellite System), for example GPS, aboard the individual construction site vehicles. Readers that detect markings at certain points for the identification of individual construction site vehicles are also conceivable. Such markings can be detected wirelessly (for example optically) or wire-bound (for example inductively). The markings can be e.g. RFID tags or printed markings, such as bar codes.

In an advantageous variant of the invention, the navigation module is adapted to generate a navigation recommendation for a travel route causing as little shaking as possible for certain construction site vehicles, taking into consideration characteristic numbers for the condition of several road sections. The respective construction site vehicles can be in particular transport vehicles for transporting asphalt material to the site. If roads are in a bad condition, that means if they have a lot of potholes, the shaking generated during driving contribute to the segregation of the asphalt, as in the movement of the mixed goods, and heavier components are separated from lighter fractions. A segregation of the asphalt therefore occurs when the transport vehicle has to master long approach routes on bad road sections. By the selection of approach roads with more regular surfaces that cause little shaking, segregation of the asphalt on the transport vehicle can be effectively suppressed. Since there is no, or at least much less, segregation, one can subsequently produce a high-quality road topping with the asphalt.

A display device at the control room and/or at a construction site vehicle can be designed to indicate the at least one digital map. In this manner, a coordinator in the control room or a driver of a construction site vehicle can quickly gain an overview of the available road sections, their quality, traffic jams, or the like.

Preferably, the current position of several construction site vehicles can be indicated on the display device. With this arrangement, the operator detects which road sections are already highly frequented or blocked by a vehicle that is slowly driving, so that less frequented or unblocked alternative routes can be taken.

BRIEF DESCRIPTION OF THE DRAWINGS

Below, an advantageous embodiment of the invention will be illustrated more in detail with reference to a drawing. The figures show in detail.

DETAILED DESCRIPTION OF THE INVENTION

Figure 1:
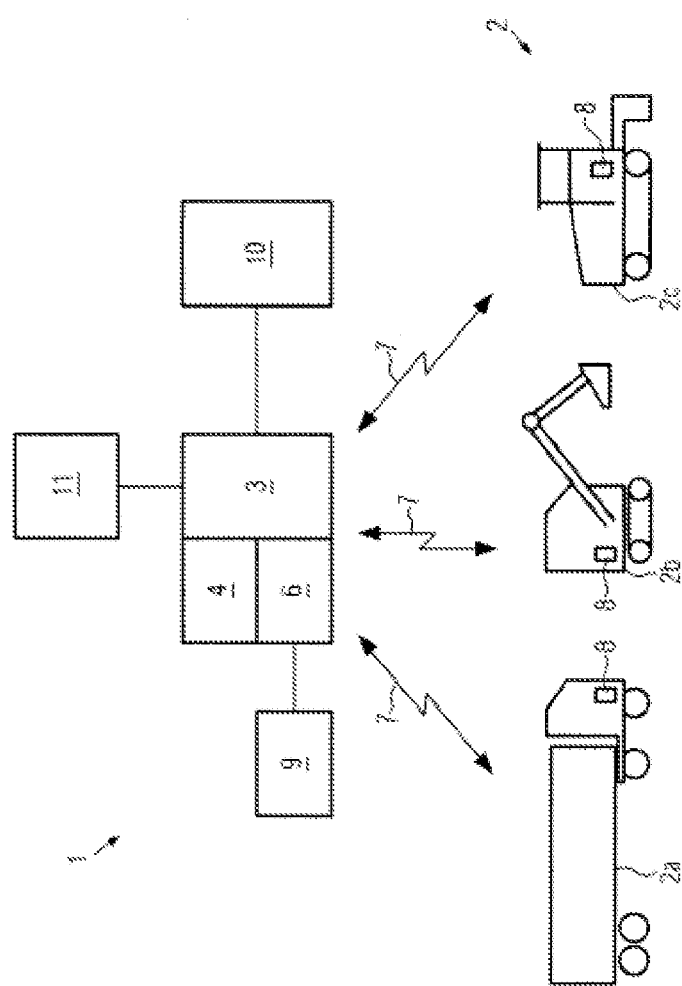
FIG. 1 a schematic representation of a system according to the invention.

FIG. 1 schematically shows an embodiment of a system 1 according to the invention for controlling construction site vehicles 2. These construction site vehicles are, in the present example, a truck 2a, in particular for transporting mixed laying material, an excavator 2b, and a road finishing machine 2c. The number of construction site vehicles 2 contained in the system 1 according to the invention and the individual types of construction site vehicles are, however, arbitrary.

The system 1 furthermore comprises a control room 3, which can be located, for example, in a job-site office, a planning office or an architectural office, or else in an office of a motor carrier or an operator of a construction machine fleet. The control room 3 comprises a memory 4 in which at least one digital map 5 is stored (see FIG. 2). A navigation module 6 implemented in the form of a computer program is designed to generate navigation recommendations observing certain rules. A communication interface at the control room 3, for example an internet, infrared, mobile communication, bluetooth or other interface, is designed to transmit the navigation recommendations generated by the navigation module 6 to the individual construction site vehicles 2 via suited communication channels 7. The construction site vehicles 2 themselves comprise transponders that are suitable for receiving the navigation recommendations obtained via the communication channel 7. A control unit at the construction site vehicle 2 can convert the navigation recommendations into acoustically or optically indicated navigation hints for the driver of the respective construction site vehicle 2.

Each construction site vehicle 2 in the system 1 according to the invention is provided with a vehicle detection means 8, for example a GNSS receiver (GNSS: Global Navigation Satellite System). The vehicle detection means 8 can detect the current position of the respective construction site vehicle 2 and submit it, together with information on the current time, to the control room 3 by means of the communication channel 7.

In this manner, the control room 3 is regularly informed about the current position of each construction site vehicle 2.

A display device 9, for example a monitor, is provided at the control room 3. On this display device 9, a digital map 5 stored in the memory 4 can be selected and displayed. Here, the current position of each construction site vehicle 2 detected with the system 1 according to the invention can be simultaneously represented.

A measuring device 10 is coupled, or connected with the control room 3 via a suited data transmission section. The measuring device 10 can be, for example, a meteorological station for measuring current weather data and transmitting such data to the control room 3. In addition, the control room 3 can be connected with an external source of information 12, for example with the internet. Via the source of information 11, the control room 3 can receive further current and site-related information which is optionally processed in the navigation module 6, together with the weather data, to create navigation recommendations.

Figure 2:
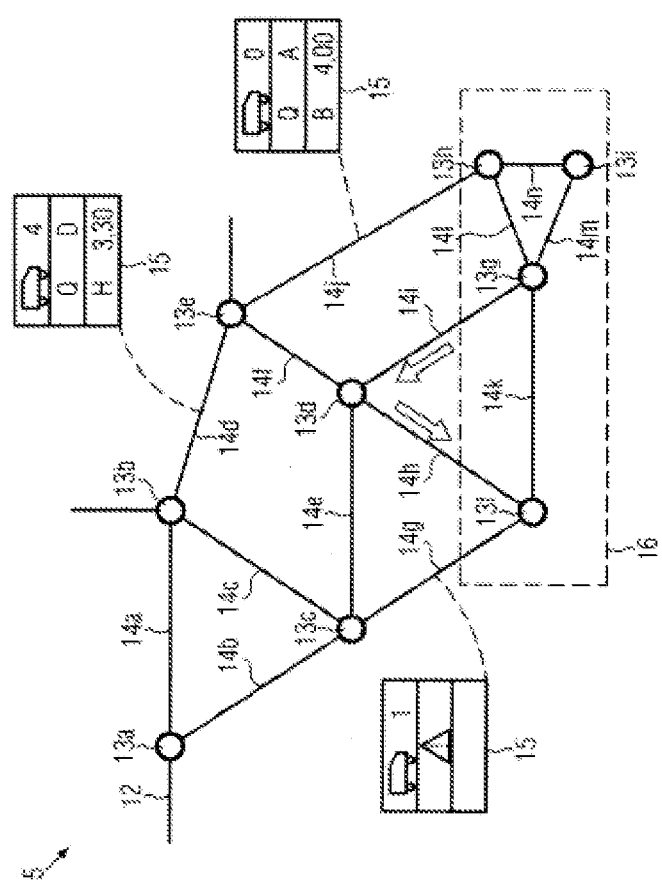
FIG. 2 a detail from a digital map stored in the system according to the invention.

FIG. 2 shows a representation of a digital map 5 which is stored in the memory 4 of the control room 3 and can be represented on the display device 9. This digital map 5 comprises a road system 12 comprising several junctions 13 (in the embodiment junctions 13a to 13e) and several road sections 14 connecting the junctions 13 (in the present example road sections 14a to 14n). For each road section 14a to 14n, a route and at least one, but preferably several, pieces of additional information 15 are stored in the digital map 5.

This additional information 15 is shown exemplarily for the road sections 14d, 14g and 14j. For the road section 14d, the digital map 5 shows, as additional information 15, that at present, four construction site vehicles are located on this road section 14d. The road condition of this road section 14d is rather bad. This is indicated by a characteristic number for the road condition or its quality (Q) which is only classified in category "D", while "A" would represent the best road condition. The characteristic number "D" for the road condition designates a road section on which many unevennesses, such as potholes, are present, and on which therefore strong shaking must be expected. The characteristic number "3.30" in the category "H" indicates that this road section 14d may only be frequented by construction vehicles having a maximal height of 3.30 meters, for example due to correspondingly lower underpasses or bridge constructions.

For the road section 14g, it is indicated that at present one construction site vehicle is located on this road section. The warning sign signals that this road section 14g can be currently only passed with difficulties, possibly due to the work performed by the construction site vehicle 1.

No construction site vehicle 2 is on its way on the road section 14j at present. The characteristic number for the condition "Q" of this road section 14j is indicated with "A", i.e. this road section j is of an excellent quality. The characteristic number "4.00" indicates that this road section 14j in some areas has a width of only 4.00 meters.

A field 16 represented in a dashed line shows the construction site area. In this construction site area, there are the junctions 13f to 13i of the route system 12. At the road sections 14h, 14e, arrows represent, as further additional information 15, a one-way road regulation. The road section 14h is accordingly a site approach road, while road section 14i is a site exit.

The additional information 15 is stored in an editable file. Here, one single file can be provided for the complete digital map 5, or separate files can be stored each for details of this digital map 5 or individual road sections 14.

In the operation of the system 1 according to the invention, a digital map 5 is retrieved from the memory 4 in the control room 3. The control room 3 moreover obtains information on the location of the individual construction site vehicles 2 which is transmitted to the control room via the communication channels 7. Moreover, the control room 3 obtains information from the measuring device 10 and the external source of information 11.

In the navigation module 6, a navigation recommendation for a certain construction site vehicle 2a to 2c is now generated by means of the digital map 5 and transmitted to this construction site vehicle 2a to 2c by means of the communication channel 7. The construction site vehicle 2 can thereupon optimize its travel route.

For example, a truck 2a is to transport asphalt material from a mixing plant located at a junction 13b to a road finishing machine 2c which is located at the junction 13h on the construction site area 16. This shortest route between the junction 13b and 13h runs over the road sections 14b and 14j. The navigation module 6 identifies, however, that the condition of the road section 14d is listed only in category "D" and is therefore obviously very bad. The shaking to be expected there could segregate the asphalt material and decisively affect its quality. In contrast, on the road section 14g, one has to expect traffic jams or delays. The optimal travel route for the truck 2a therefore runs over the road sections 14c, 14e, 14h, 14k and 14l. The navigation module transmits a corresponding navigation recommendation to the truck 2a. This navigation recommendation can be represented on a display device 9 in the driver's cabin of the truck 2a, so that the driver of the truck 2a can act in accordance with it.

During their movement, the construction site vehicles 2 transmit location information to the control room 3 at regular intervals. With reference to this location information and the respective times, the control module 13 can calculate how long the construction site vehicles 2 have been on their way on the individual road sections 14. From this, the control module 3 can in turn see which road sections 14 permit a particularly quick movement of the construction site vehicles 2, so that the navigation module 6 can select these road sections 14 in its navigation recommendations.

The digital map 5 can be constantly updated at the control room 3. For this, the location information of the individual construction site vehicles 2 can be taken into consideration, as well as further information which is obtained from the measuring device 10 or from the external source of information 11. Moreover, an operator can change the additional information 15 for certain road sections 14, and further junctions 13 or road sections 14 can be added, or existing junctions 13 and road sections 14 can be removed. All features of this embodiment can contribute to the success of the system according to the invention individually or in any combination.

The invention claimed is:

1. A system for controlling construction site vehicles, the system comprising a plurality of construction site vehicles and a control room, wherein communication channels are provided between the control room and the construction site vehicles on which data can be transmitted between the control room and the construction site vehicles, and further comprising at least one digital map stored in the control room, in which for individual road sections, in addition to the route of the respective road section, at least one additional piece of information is stored, and a navigation module designed to generate, with reference to the at least one digital map, navigation recommendations for the construction site vehicles;
   wherein the at least one additional piece of information comprises coordinates of temporary roadways, coordinates of temporary site approach roads, coordinates and direction of temporary one-way road sections, a characteristic number of the condition of the road section, a characteristic number of a maximal axle load, a characteristic number of a maximal vehicle or road width, a characteristic number of curve radii, a characteristic number of a height restriction, a characteristic number of a maximal speed, operation times, obstacles, traffic jam information or information on temporary driving bans.

2. The system according to claim 1, wherein the navigation module comprises a computer readable medium including program instructions.

3. The system according to claim 1, wherein the navigation module is implemented in the control room or in a construction site vehicle.

4. The system according to claim 1, wherein the route or the stored additional information of a road section can be changed in the digital map.

5. The system of claim 1, wherein the communications channels comprise wireless transmissions.

6. The system according to claim 1, wherein the additional information comprises information on construction site vehicles currently present on the respective road section.

7. The system according to claim 1, wherein the additional information is stored in the form of an editable file for the allocated road section.

8. The system according to claim 1, wherein the additional information can be edited taking into consideration data transmitted from a construction site vehicle to the control room.

9. The system according to claim 8, which comprises transmitting information on locations and time from a construction site vehicle to the control room.

10. The system according to claim 9, wherein the system comprises a GNSS receiver or a reader that is adapted to detect markings for detecting the construction site vehicles.

11. The system of claim 1, wherein the construction site vehicles comprise paving machines.

12. The system according to claim 1, comprising a display device for indicating the at least one digital map positioned in the control room or on a construction site vehicle.

13. The system according to claim 12, wherein the current positions of several construction site vehicles can be displayed at the display device.

14. A system for controlling construction site vehicles, the system comprising a plurality of construction site vehicles and a control room, wherein communication channels are provided between the control room and the construction site vehicles on which data can be transmitted between the control room and the construction site vehicles, and further comprising at least one digital map stored in the control room, in which for individual road sections, in addition to the route of the respective road section, at least one additional piece of information is stored, and a navigation module designed to generate, with reference to the at least one digital map, navigation recommendations for the construction site vehicles wherein the navigation module is adapted to generate a navigation recommendation for a travel route minimizing shaking for certain construction site vehicles, taking into consideration characteristic numbers for the condition of several road sections.

15. The system according to claim 14, wherein the at least one additional piece of information comprises coordinates of temporary roadways, coordinates of temporary site approach roads, coordinates and direction of temporary one-way road sections, a characteristic number of the condition of the road section, a characteristic number of a maximal axle load, a characteristic number of a maximal vehicle or road width, a characteristic number of curve radii, a characteristic number of a height restriction, a characteristic number of a maximal speed, operation times, obstacles, traffic jam information or information on temporary driving bans.

16. The system according to claim 14, wherein the additional information can be edited taking into consideration data transmitted from a construction site vehicle to the control room.

17. A system for controlling construction site vehicles, the system comprising a plurality of construction site vehicles and a control room, wherein communication channels are provided between the control room and the construction site vehicles on which data can be transmitted between the control room and the construction site vehicles, and further comprising at least one digital map stored in the control room, in which for individual road sections, in addition to the route of the respective road section, at least one additional piece of information is stored, and a navigation module designed to generate, with reference to the at least one digital map, navigation recommendations for the construction site vehicles, wherein the additional information can be edited taking into consideration data transmitted from a construction site vehicle to the control room.

* * * * *